No. 852,700. PATENTED MAY 7, 1907.
P. A. BROWN.
AUTOMATIC DEVICE FOR PRODUCING INTERMITTENT MOTION.
APPLICATION FILED JULY 25, 1905.
2 SHEETS—SHEET 1.
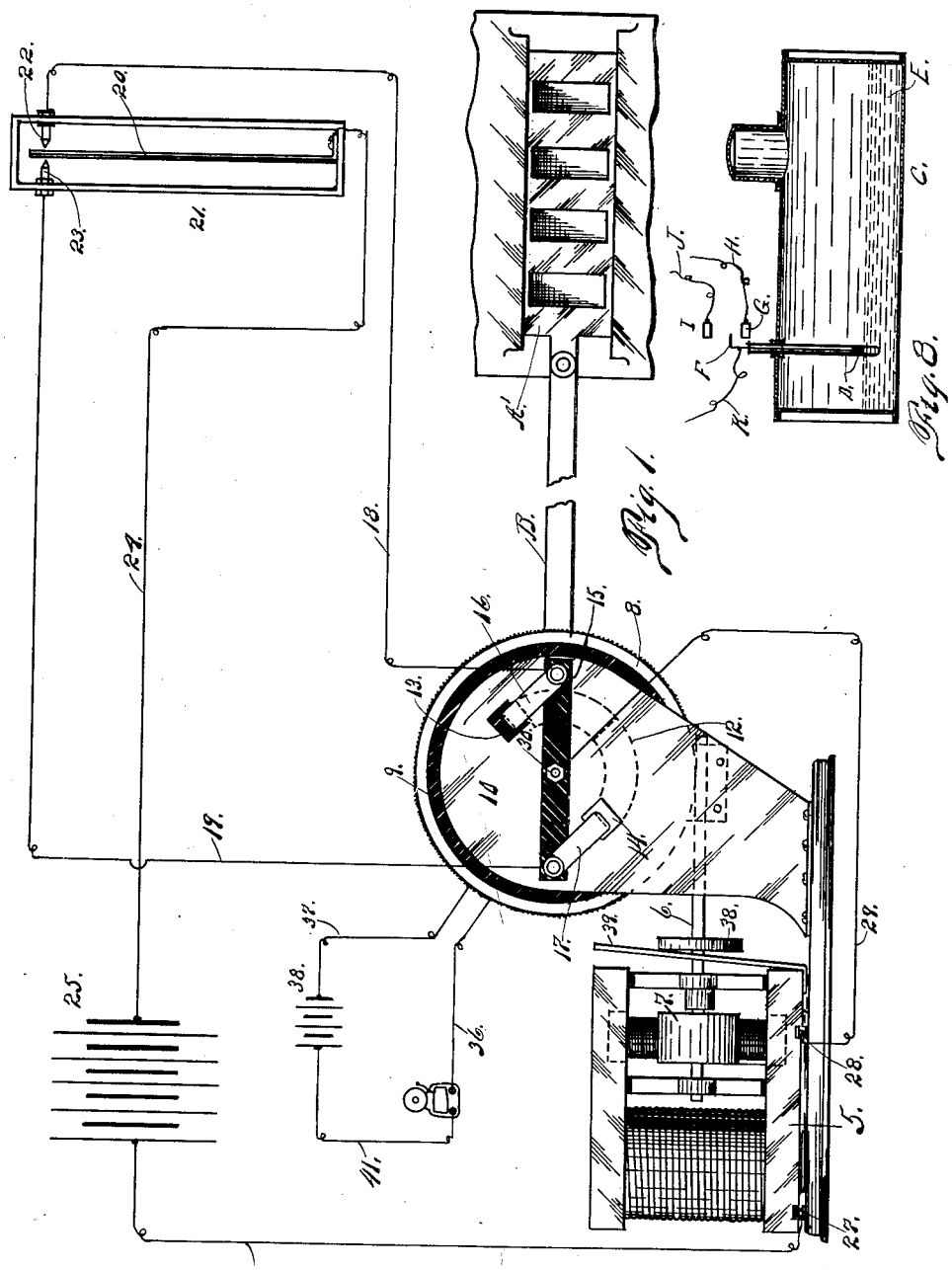

No. 852,700. PATENTED MAY 7, 1907.
P. A. BROWN.
AUTOMATIC DEVICE FOR PRODUCING INTERMITTENT MOTION.
APPLICATION FILED JULY 25, 1905.
2 SHEETS—SHEET 2.
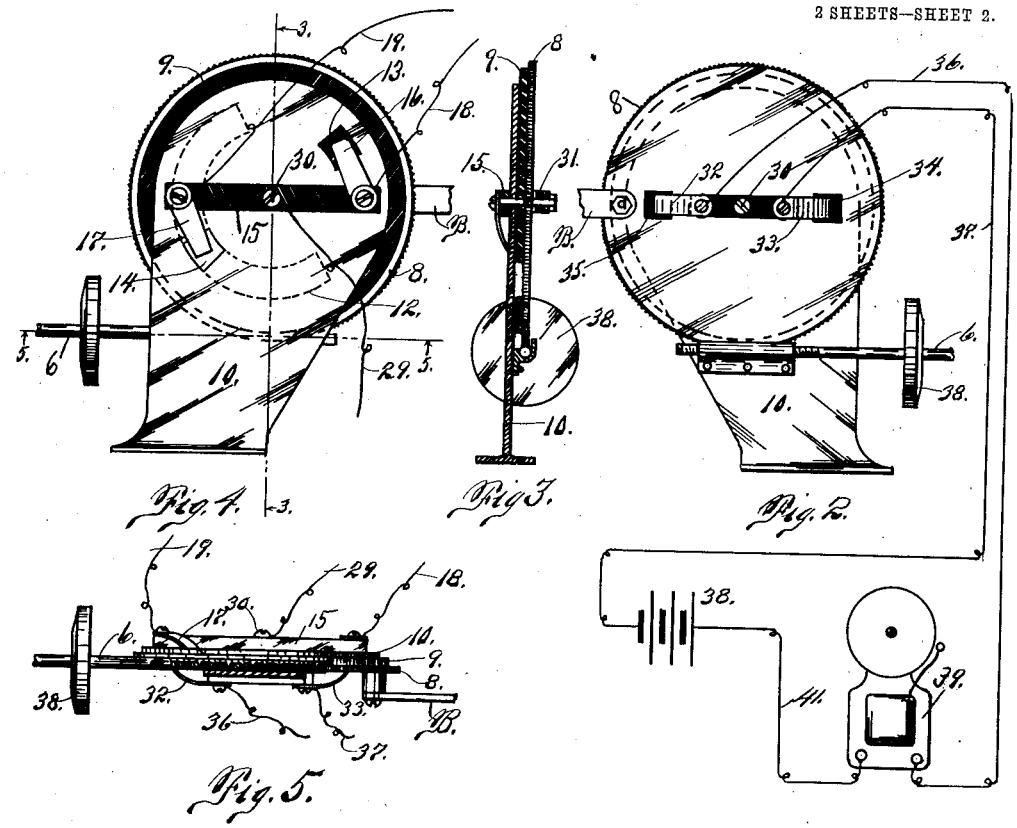
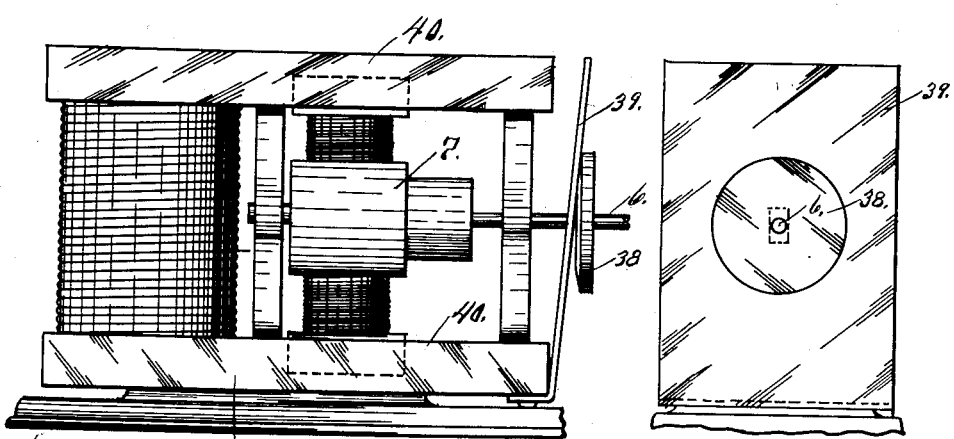
Witnesses
Burt L. Rhoads.
Dena Nelson.
Inventor
P. A. Brown.
By
Attorney

UNITED STATES PATENT OFFICE.

PEABODY A. BROWN, OF DENVER, COLORADO.

AUTOMATIC DEVICE FOR PRODUCING INTERMITTENT MOTION.

No. 852,700.  Specification of Letters Patent.  Patented May 7, 1907.

Application filed July 25, 1905. Serial No. 271,152.

*To all whom it may concern:*

Be it known that I, PEABODY A. BROWN, a citizen of the United States, residing at the city and county of Denver and State of Colorado, have invented certain new and useful Improvements in Automatic Devices for Producing Intermittent Motion; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an automatic electric device for producing intermittent motion, the said device being originally or primarily controlled by thermal or other conditions. For instance I may employ an electric motor whose circuit is controlled by a thermostat having an arm vibrating between two points, one being on the "hot" side and the other on the "cold" side of the device, the circuits being so arranged that when the vibrating bar touches either of these points the motor circuit will be closed. Furthermore the motor is connected to rotate a make-and-break-disk with which is connected an arm or pitman adapted to be connected with the damper of a furnace or other heating device, the disk mechanism being so constructed and arranged that when the vibrating bar of the thermostat touches the point of the hot side for instance, the motor will turn the disk a half revolution when the motor circuit will be broken. The disk will then remain stationary until the bar engages the point on the cold side of the thermostat, when the motor circuit will be again closed, in which event the disk will be given another half revolution in the same direction but causing the operating arm or pitman to move in the opposite direction. By virtue of this arrangement reciprocating movement will be automatically produced. It is evident, however, that the make and break devices in connection with the disk may be so arranged that the movement of the disk may be greater or less than a half revolution for every circuit closing act of the thermostat. It is further evident that instead of a thermostat, other devices controlled by other than thermal conditions may be employed to produce the original circuit-closing act of the apparatus.

If desired an alarm device may be used in connection with the disk whereby the operator or person within hearing distance may be notified in case the apparatus should not work properly or should get out of repair and fail to produce the complete predetermined movement.

Having briefly outlined my improved construction as well as the function it is intended to perform, I will proceed to describe the same in detail reference being made to the accompanying drawing in which is illustrated an embodiment thereof.

In this drawing, Figure 1 is a side elevation of my improved construction arranged to produce reciprocating motion as required in opening and closing a damper, cut-off or other similar device for use in connection with heating or ventilating rooms for instance. Fig. 2 is a fragmentary view of the construction shown in Fig. 1 but viewed from the opposite side. Fig. 3 is a section taken on the line 3—3 Fig. 4. Fig. 4 is a view similar to Fig. 3 but viewed from the same side shown in Fig. 1. Fig. 5 is a view from below of the construction shown in Fig. 5. Fig. 6 is an enlarged view of the motor showing the worm spindle partly broken away. Fig. 7 is an end view of the motor. Fig. 8 is a view of a modified form of construction illustrating means for automatically controlling the level of the water in the boiler or other receptacle.

The same reference characters indicate the same parts in all the views.

Let the numeral 5 designate an electric motor having a worm spindle 6 connected with its armature 7, the worm engaging the toothed periphery of a disk or wheel 8 to one side of which is secured an insulating plate 9 while on the side of the insulating plate remote from the disk, a supporting plate 10 is located. This plate 10 as shown in the drawing simply forms a support and reinforcement for the disk and insulating plate 9 which is attached to the disk and rotates therewith. This disk is composed of any suitable material forming a good conductor of the electric circuit but it is preferably made of metal.

As shown in the drawing the insulating plate or disk 9, is provided with a semi-circular slot 12 while the supporting device 10 is provided with an opening 13 located diametrically opposite another opening 14. To an insulating plate 15 engaging the outer surface of the support 10, are attached two metal brushes designated 16 and 17 respectively. These brushes are located to alternately engage or project into the openings 13 and 14 of the support 10, as the disk rotates. The brushes 16 and 17 are connected with separate branches designated 18 and 19 of the motor circuit, these branches being alternately employed in closing the circuit depending on the position of the movable bar 20 of the thermostat 21, the said bar being arranged to vibrate between the contacts 22 and 23 according to the thermal conditions in the vicinity where the thermostat is located. The branch 18 of the circuit leads from the brush 16 to the contact 22; while the branch 19 leads from the contact 17 to the contact 23. A conductor 24 leads from the movable bar 20, to one pole of a source of electricity 25; while a conductor 26 leads from the opposite pole of the source to a pole 27 of the motor. From the opposite pole 28 of the motor, leads a conductor 29 to the conducting axle 30, upon which the disks 8 and 9 are mounted to rotate. Whenever either brush 16 or 17 is in position to pass through the slot 12 of the insulating disk 9, the motor circuit will be closed. When one of these brushes is in the said position, the circuit will be closed through one of the branches 18 and 19, while when the other brush is in the same position, the motor circuit will be closed through the other of said branches, the other elements of the motor circuit being common to both conditions.

By reference to Fig. 3 it will be observed that a stationary insulating strip 31, is mounted on the spindle 30 in contact with the disk 8. Upon this strip are mounted two brushes 32 and 33 adapted to pass through openings 34 and 35 respectively, formed in the disk, the said openings being diametrically located and brought into position to engage the insulating disk 9 whenever the disks 8 and 9 have completed a half revolution. During these periods, a signaling circuit is completed through the instrumentality of conductors 36, 37 and 41; a source of electricity 38 and a bell 39. By virtue of this construction and arrangement, as soon as the two disks 8 and 9 complete their predetermined travel for each act whereby the motor circuit is closed, the circuit of the signaling bell will be open. But during the travel of the disk, the bell circuit will be closed. Hence if the signal bell should continue to ring longer than is required for the disks 8 and 9 to travel their predetermined distance, the attendant or operator will know that the apparatus is out of order.

In order to check the travel of the worm spindle through the momentum required by the motor armature, as soon as practicable after the motor circuit is closed, I employ a break device consisting of a disk 38 mounted upon the spindle, and a spring armature 39 whose lower extremity is fixedly secured, its upper extremity being free. The normal tendency of this armature is to engage the disk 38 and check the movement of the armature spindle and consequently the movement of the disks 8 and 9. As soon, however, as the motor circuit is closed and the field magnets 40—40 are energized, the armature 39 is drawn away from the disk whereby the worm spindle is unretarded by the braking armature. This armature has an opening through which the worm spindle passes and of sufficient size to allow the spindle to clear the armature at all times.

From the foregoing description the use and operation of my improved device will be readily understood. Assuming that the parts are in the position shown in Fig. 1 of the drawing, that is to say with the movable bar 20 of the thermostat located intermediate the contact pins 22 and 23 but not touching either, the motor circuit will be broken. Assuming also that the disks 8 and 9 are in the position shown in the same figure, that is to say with the brush 17 at one end of the slot 12 of the insulating plate and consequently engaging the metal disk 8, if the heat of the apartment rises sufficiently to actuate the bar 20 (which by the way is composed of two substances possessing the qualities of expansion and contraction in unequal degrees) and cause it to engage the contact 23, the motor circuit will be closed through the conductor 19, the brush 17, the disk 8, the axle 30, the conductor 29, the motor and through the motor to the conductor 26, and thence through the source 25, the conductor 24 and the bar 20 completing the circuit. Now as the motor circuit is closed the armature 29 will be drawn away from the brake disk 38, and the worm spindle 6 will be actuated and by virtue of its engagement with the toothed periphery of the disk 8, the disk will be given a half revolution or turn far enough to bring the free extremity of the brush 17 into engagement with the insulating disk 9 through the opening 13 of the supporting device 10, when the motor circuit will be broken. During this time the slide A' to be actuated has been moved through the instrumentality of the pitman or connecting rod B, the limit of its stroke in one direction presumably in the direction to close the damper or cut off of the heating device for instance. Now the parts will remain in this position until the apartment has become sufficiently cool to cause the thermostatic bar 20 to move over to the cold side of the thermostat to engagement with the contact pin 22. It must be remembered that when the disks 8 and 9 stop after making a half revolution as previously explained, the free extremity of the brush 17 was in engagement with the insulating disk 9 through the opening 13, while the free extremity of the brush 16 was in engagement with the metal disk 8 through the opening 14. Now if the bar 20 engages the pin 22 as aforesaid, the motor circuit will be completed through the conductor 18, the brush 16, the metal disk 8, the axle 30, the conductor 29, the motor, the conductor 26, the source of electricity 25, the conductor 24, and the thermostatic bar 20. Now rotation of the armature will again actuate the disks 8 and 9 and impart a half revolution in the same direction as before, during which time the pitman B will be given a stroke in the opposite direction, and the slide or damper A' presumably opened. When this has been accomplished, the free extremity of the brush 17 will engage the disk 8 through the opening 14, while the free extremity of the brush 16 will engage the insulating disk 9 through the opening 13 the same as in Fig. 1, these parts having resumed their normal position. As soon as the motor circuit is broken, in any case, the field magnets on the motor will of course be deënergized, allowing the armature spring 39 to move to engagement with the disk 38 thus serving to stop the motor as nearly instantaneously as practicable.

In the form of construction shown in Fig. 8, let C designate a water receptacle as a boiler; while D designates a float. Now when the water E becomes sufficiently low to cause the rod F connected with the float to engage a contact G, the motor circuit will be completed through a conductor H, and a cut off (not shown) actuated by the rotary circuit breaker to allow the water to enter the boiler until the float rises and breaks the motor circuit. Or the arrangement may be such that when the water has reached the desired or necessary height in the boiler, the float will rise and cause the rod F to engage a contact I in which event the motor circuit will be completed through the conductor J whereby the cut-off (not shown) will be actuated by the disk to cut off the water. A contact K connected with the rod forms a common path for the current in both instances, that is to say when the rod is in engagement with either of the contacts I or G.

Having thus described my invention, what I claim is:

1. The combination of an alternating circuit closer, a motor, two circuits in which the motor is located, a movable circuit breaker operated from the motor and controlling both circuits, and an electric alarm or signal whose circuit is closed by the circuit breaker except when the latter has reached its normal limit of movement.

2. The combination with a device to be actuated, of a movable circuit breaker connected in operative relation with the said device and including a disk revolubly mounted and having a toothed periphery, a motor, a worm spindle actuated by the motor for operating the disk, and a motor brake comprising a spring-actuated armature apertured to receive the spindle and a part mounted on the spindle and adapted to be engaged by the armature as soon as the motor circuit is broken, the brake being released as soon as the said circuit is closed.

3. The combination of an electric motor, a revoluble disk, a spindle actuated by the motor and connected in operative relation with the disk, a part fast on the spindle, and a spring-actuated armature apertured to receive the spindle and adapted to engage the part on the spindle as soon as the motor circuit is broken.

4. The combination of a motor, a rotary circuit breaker comprising a disk having a toothed periphery, and a worm spindle operated from the motor to actuate the circuit breaker, and a spring-actuated armature rendered inactive by the magnet of the motor but released when the circuit through the motor is broken, the armature being arranged to act on the spindle to overcome the momentum of the motor.

5. The combination of a motor, a rotary circuit breaker connected in operative relation with the motor, and a spring-actuated armature rendered inactive by the motor when the circuit is closed therethrough but connected with the motor to overcome its momentum when the motor circuit is broken.

In testimony whereof I affix my signature in presence of two witnesses.

PEABODY A. BROWN.

Witnesses:
  A. J. O'BRIEN,
  DENA NELSON.